United States Patent
Eriksson et al.

(10) Patent No.: US 10,330,029 B2
(45) Date of Patent: Jun. 25, 2019

(54) METHOD FOR A MORE EFFICIENT USE OF A COMBUSTION ENGINE IN A VEHICLE

(75) Inventors: Anders Eriksson, Torslanda (SE); Peter Templin, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 1164 days.

(21) Appl. No.: 12/739,155

(22) PCT Filed: Oct. 26, 2007

(86) PCT No.: PCT/SE2007/000946
§ 371 (c)(1),
(2), (4) Date: Apr. 22, 2010

(87) PCT Pub. No.: WO2009/054757
PCT Pub. Date: Apr. 30, 2009

(65) Prior Publication Data
US 2010/0262343 A1    Oct. 14, 2010

(51) Int. Cl.
*B60W 10/06* (2006.01)
*B60W 50/08* (2012.01)
(Continued)

(52) U.S. Cl.
CPC ........... *F02D 31/001* (2013.01); *B60W 10/06* (2013.01); *B60W 30/1882* (2013.01);
(Continued)

(58) Field of Classification Search
None
See application file for complete search history.

(56) References Cited

U.S. PATENT DOCUMENTS 4,102,222 A * 7/1978 Miller ................. F16H 61/0204
477/120
4,630,508 A * 12/1986 Klatt ..................... B60W 30/18
477/900
(Continued)

FOREIGN PATENT DOCUMENTS

DE    102004002813    8/2005
EP    0719966 A1    7/1996
(Continued)

OTHER PUBLICATIONS

International Search Report for corresponding International Application PCT/SE2007/000946.
(Continued)

*Primary Examiner* — Jean Paul Cass
(74) *Attorney, Agent, or Firm* — WRB-IP LLP

(57) ABSTRACT

A method for a more efficient use of a vehicle combustion engine during driving, the vehicle including an automatic step geared transmission. The method includes the steps of sensing current engine rotational speed and engine rotational speed increase, estimating necessary minimum upshift engine rotational speed for a coming gear upshift, registering that the engine rotational speed stops increasing without reaching the minimum upshift engine rotational speed, and where the engine rotational speed stops increasing relatively close to a maximum engine rotational speed where engine efficiency is relatively low and, automatically controlling engine output torque in order to limit the engine rotational speed to a first predetermined engine speed where engine efficiency is relatively high.

14 Claims, 2 Drawing Sheets

(51) Int. Cl.
*F02D 29/02* (2006.01)
*F02D 31/00* (2006.01)
*F02D 41/02* (2006.01)
*F16H 59/36* (2006.01)
*F16H 61/16* (2006.01)
*B60W 30/188* (2012.01)

(52) U.S. Cl.
CPC ........... *B60W 50/087* (2013.01); *F02D 29/02* (2013.01); *F02D 41/0215* (2013.01); *F02D 2200/701* (2013.01); *F02D 2250/18* (2013.01); *F16H 2059/363* (2013.01); *F16H 2059/366* (2013.01); *F16H 2061/161* (2013.01)

(56) References Cited

U.S. PATENT DOCUMENTS

| | | | | |
|---|---|---|---|---|
| 4,905,544 A * | 3/1990 | Ganoung | ............. | B60W 30/18 477/109 |
| 5,136,495 A * | 8/1992 | Tokoro | ................. | B60W 30/18 474/12 |
| 5,476,424 A * | 12/1995 | Fujii | ................... | B60L 11/1807 180/65.8 |
| 5,544,056 A * | 8/1996 | Seireg | ................... | B60W 10/06 180/178 |
| 5,685,801 A | 11/1997 | Benford et al. | | |
| 5,948,034 A * | 9/1999 | Tihanyi | ................. | B60W 10/02 477/120 |
| 6,076,036 A | 6/2000 | Price et al. | | |
| 6,278,931 B1 * | 8/2001 | Crawford | ............. | B60K 31/047 180/170 |
| 6,311,113 B1 * | 10/2001 | Danz | ................. | F16H 61/66259 474/28 |
| 6,364,808 B1 * | 4/2002 | Saur | ..................... | B60K 31/047 477/108 |
| 6,503,170 B1 * | 1/2003 | Tabata | ................ | F16H 59/0204 475/254 |
| 6,616,575 B1 * | 9/2003 | Lorentz | ............... | B60W 10/023 477/115 |
| 7,263,429 B2 * | 8/2007 | Bauerle | .................. | B60K 31/04 123/319 |
| 7,302,333 B2 * | 11/2007 | Steen | ..................... | B60K 28/16 180/197 |
| 7,356,403 B2 * | 4/2008 | Yoshioka | ............. | B60W 10/06 477/48 |
| 7,497,201 B2 * | 3/2009 | Hollenbeck | ......... | F02D 41/2422 123/435 |
| 7,556,585 B2 * | 7/2009 | Landes | ................... | F16H 61/16 477/107 |
| 7,684,919 B2 * | 3/2010 | AbuSamra | ........ | B60W 30/1882 477/115 |
| 7,717,823 B2 * | 5/2010 | Balamucki | .......... | F16H 61/0213 477/115 |
| 7,739,023 B2 * | 6/2010 | Lee | ............................ | B60T 7/22 123/350 |
| 7,912,615 B2 * | 3/2011 | Lindgren | ............ | F16H 61/0213 701/55 |
| 7,987,934 B2 * | 8/2011 | Husennan | .............. | B60K 6/445 180/65.21 |
| 8,145,398 B2 * | 3/2012 | Landes | ................ | F16H 61/0213 701/51 |
| 2003/0144788 A1 * | 7/2003 | Brackney | ............. | F02D 41/0002 701/103 |
| 2003/0216847 A1 * | 11/2003 | Bellinger | .............. | B60W 10/06 701/51 |
| 2004/0128049 A1 * | 7/2004 | Kabe | ..................... | F02D 41/123 701/54 |
| 2007/0099752 A1 * | 5/2007 | Saito | .................... | F16H 61/0213 477/34 |
| 2007/0099756 A1 * | 5/2007 | Saito | ....................... | F16H 59/08 477/121 |
| 2008/0153660 A1 * | 6/2008 | Uejima | .................... | B60K 6/40 477/3 |
| 2009/0018732 A1 * | 1/2009 | Choby | ................. | F16H 59/66 701/51 |
| 2009/0093936 A1 * | 4/2009 | Lindgren | ............ | F16H 61/0213 701/55 |
| 2009/0233760 A1 * | 9/2009 | Silveri | ..................... | B60K 6/52 477/3 |
| 2012/0083980 A1 * | 4/2012 | Kresse | ................ | F16H 61/0213 701/56 |

FOREIGN PATENT DOCUMENTS

| | | | |
|---|---|---|---|
| FR | 2813050 A | | 2/2002 |
| JP | H03-172666 | * | 7/1991 |
| JP | H08295154 | | 11/1996 |
| JP | 08295154 A | | 12/1996 |
| WO | 9706374 A1 | | 2/1997 |
| WO | 2005049996 A1 | | 6/2005 |

OTHER PUBLICATIONS

Supplementary European Search Report (dated Dec. 17, 2013) for corresponding European App. EP 07 83 5146.
Brazilian Official Action (dated Jun. 15, 2018) for corresponding Brazilian App. PI0722257-2.
Indian Official Action (dated Oct. 11, 2017) for corresponding Indian App. 760/MUMNP/2010.

* cited by examiner

METHOD FOR A MORE EFFICIENT USE OF A COMBUSTION ENGINE IN A VEHICLE

BACKGROUND AND SUMMARY

The present invention relates to a method for a more efficient use of a combustion engine in a vehicle, by, during certain vehicle conditions, automatically controlling engine rotational speed in a predetermined way.

The present invention also relates to a computer program and computer program product both to be used with a computer for executing said method.

In vehicles equipped with an automatic transmission a situation can sometimes occur in uphill drive where a transmission control unit estimates that an upshift to a new gear will not be possible due to that the engine of the vehicle will not be able to accelerate the vehicle to a sufficiently high vehicle speed so that the engine will manage to drive the vehicle with said new gear engaged. An alternative to the estimation, that the engine of the vehicle will not be able to accelerate the vehicle to a sufficiently high vehicle speed, is to simply register that the engine rotational speed increase has stopped before reaching the right engine rotational speed for upshift. This usually leads to the engine being stuck or "hanging" at relatively high engine rotational speeds without the transmission being able to perform an upshift. A typical example for a heavy duty truck could be that the engine must increase its speed to above 1850 rpm to be able to after an upshift land on a rotational speed with the new gear engaged that gives the engine the possibility to produce enough torque to at least be able to maintain current vehicle speed. In order to gain a better margin it could be necessary to increase the engine rotational speed to even higher rotational speeds, such as 1900 to 1950 rpm, before a gear upshift to the new gear is initiated. At these relatively high engine rotational speeds the efficiency of the engine is relatively low, and having the engine stuck at these relatively high engine rotational speeds contributes to an increased fuel consumption.

JP08-295154 discloses a cruise control in a vehicle which adapts the vehicle speed (decreases it) in for example an uphill so that the engine rotational speed arrives in a more efficient working area.

It is desirable to control the engine rotational speed in a better way in relation to a planned upshift.

The method according to an aspect of the invention is a method for a more efficient use of a combustion engine in a vehicle during driving of said vehicle, said vehicle further comprising an automatic step geared transmission for automatic gear ratio adaptation of the gear ratio between the engine rotational speed and rotational speed of driving wheels of the vehicle. Said method comprises the steps of:
— sensing current engine rotational speed and engine rotational speed increase, — estimating necessary minimum upshift engine rotational speed for a coming gear upshift; and where said method is further characterized in the steps of:
  registering that the engine rotational speed stops increasing without reaching said minimum upshift engine rotational speed, and where said engine rotational speed stops increasing relatively close to a maximum engine rotational speed where engine efficiency is relatively low and,
  automatically controlling engine output torque in order to limit the engine rotational speed to a first predetermined engine speed where engine efficiency is relatively high.

The advantage with the method according to an aspect of the invention is that fuel will be saved since unnecessary driving at inefficient engine rotational speeds will be decreased.

According to one embodiment of the method according to an aspect of the invention said step of registering that the engine rotational speed stops increasing without reaching said minimum upshift engine rotational speed is performed in advance before reaching said relatively high engine rotational speed where efficiency is relatively low. The advantage with this embodiment is that the driver will not experience any sudden power loss and vehicle speed decrease.

According to a further embodiment of the method according to an aspect of the invention, said registering step performed in advance is done through an estimation based on present prevailing vehicle conditions. In a further embodiment of the method according to the invention, said estimation is based on present prevailing vehicle conditions and vehicle conditions estimated likely to occur in near future of the vehicle. The advantage with this embodiment is that the activation and use of said automatic controlling of the engine torque can be further optimized and even more fuel can be saved.

According to one embodiment of the method according to an aspect of the invention said automatic controlling of the engine torque can only be active when a cruise control arranged in the vehicle is active. This embodiment allows the driver to have more of a full manual control when driving with the cruise control inactivated.

According to a further embodiment of the method according to an aspect of the invention, said automatic controlling of the engine torque can only be active when a first vehicle driving mode is activated, which first driving mode differs from a second driving mode of said vehicle. This first driving mode can for example be an economy mode that can be manually selected and engaged by the driver.

According to a further embodiment of the method according to an aspect of the invention, said automatic controlling of the engine torque is inactivated when a driver of the vehicle demands full power to the driving wheels. This gives the driver the possibility to override said automatic controlling in an easy and intuitive way. Thus, for example depressing an accelerator pedal to the floor will give a down shift and vehicle acceleration.

According to a further embodiment of the method according to an aspect of the invention, said automatic controlling of the engine torque is inactivated when a predetermined vehicle condition is registered. This predetermined vehicle condition can for example be a decrease of vehicle travel resistance to under a predetermined level. Thus, when the incline of an uphill slope decreases so much that the vehicle travel resistance is below said predetermined value, which decides if said upshift will be possible to perform or not, then the control unit will allow engine rotational speed increase to the upshift engine rotational speed. In a further embodiment said automatic controlling of the engine torque is activated when said vehicle travel resistance has increased to above a second predetermined level. Said first and second level can have the same value or differ from each other.

According to a further embodiment of the method according to an aspect of the invention, said automatic controlling of the engine torque is independent of if a driver of the vehicle demands maximum engine output torque or not.

Thus, a full automation will minimize the time the engine spends in the inefficient rotational speed area.

BRIEF DESCRIPTION OF THE DRAWING

The present invention will be described in greater detail below with reference to the accompanying drawing which, for the purpose of exemplification, shows further preferred embodiments of the invention and also the technical background, and in which.

DETAILED DESCRIPTION

In one embodiment the vehicle is equipped with an internal combustion engine, an automatic step geared transmission and driven wheels, to which drive power from the engine can be transmitted via different gears in the transmission. The different gears are selected and engaged by a transmission control unit. Each selectable gear has a predetermined gear ratio.

Gear selections and shift decisions are made by said control unit based on certain measured and/or calculated parameters such as vehicle speed, engine speed, rate of change of vehicle speed, rate of change of engine speed, throttle control position, rate of change of throttle control position, actuation of a vehicle braking system, currently engaged gear ratio and the like are known from prior art.

In a first preferred embodiment of the invention said control unit is programmed to estimate if a selected, not yet performed upshift is feasible. This estimation is based on a calculation with input parameters such as at least current vehicle travel resistance, engine rotational speed, engine rotational speed increase, current engaged gear and torque demand (driver demand or for example cruise control demand). These parameters could also be supplemented by parameters such as estimated vehicle travel resistance of the nearest future in order to be able to achieve a better estimation.

Figure 1:
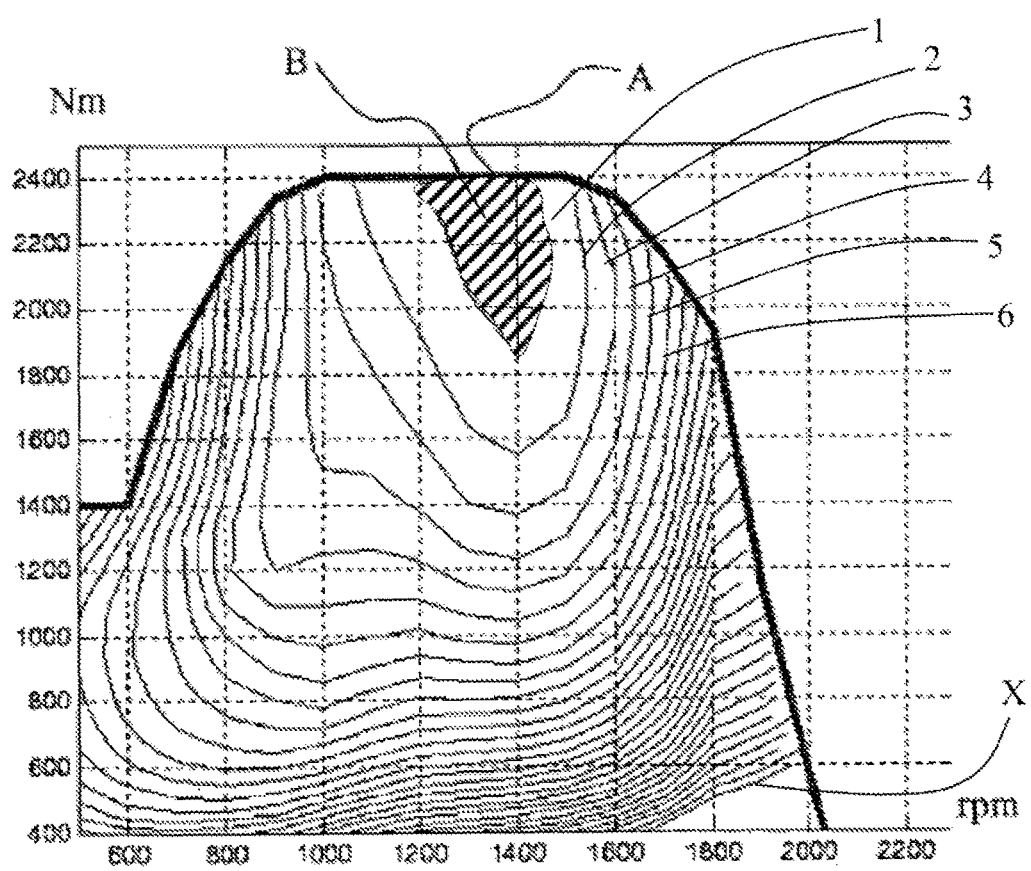
FIG. 1 discloses an example of an engine power efficiency diagram that can be used for illustrating the inventive function.

FIG. 1 discloses an engine power efficiency diagram, with engine torque in Newton meter (Nm) presented on the y-axis and engine rotational speed (rpm) presented on the x-axis. The thick curve A represents highest possible torque this engine can perform for different engine rpm:s. The thinner curves 1, 2, 3, 4, 5, 6, . . . , X, within the x, y-axis and the A-curve represents different efficiency levels for this example of engine. The most efficient working area for this engine is illustrated by a cross-hatched area designated with a B, thus it is best for the fuel economy if this engine is performing as often as possible somewhere between 1200 to 1500 rpm and between 1800 and up to 2400 Nm. Above is mentioned that the engine rpm is typically needed to be increased to above 1850 rpm or during some circumstances up to even more than 1900 rpm in order to be able to perform some upshifts during certain circumstances. As can be seen in the diagram the engine power efficiency is relatively low above approximately 1650 rpm. Maximum engine rotational speed is according to the example of FIG. 1 approximately 2000 rpm.

Said control unit can be programmed to estimate an upshift engine rotational speed, which has to be reached in order to manage to; ramp down engine torque, disengage the presently engaged gear, synchronize engine speed to the new selected gear, engage the new gear and finally ramp up engine torque to meet torque demand from for example driver or a cruise control. Further, the control unit evaluates if there is enough torque available when the new gear will be engaged at a certain engine rotational speed in order to meet the vehicle travel resistance.

According to the invention said control unit is programmed to estimate if the engine will be able to reach the upshift rotational speed or not under at least present prevailing condition, i.e. calculations are performed with at least above mentioned parameters; current vehicle travel resistance, engine rotational speed, engine rotational speed increase, current engaged gear and torque demand as input information. If the engine is estimated to not reach the upshift rotational speed then an upshift will not be initiated since the engine would be stuck at a relatively high inefficient rpm just below said upshift rotational speed. According to the invention the control unit is further programmed to not increase the engine speed when the result of the above estimation is that the engine speed will not be able to reach the upshift rotational speed.

There could be a situation in an uphill slope where the control unit has estimated that an upshift is possible, thus the engine rotational speed is allowed to increase towards the upshift rotational speed. But before the upshift rotational speed has been reached it can happen that the vehicle travel resistance increases to a level where the engine torque will not be enough to keep on accelerating the vehicle and, thus, the engine rotational speed increase ceases at a relatively high but inefficient engine rotational speed without having reached the upshift rotational speed. According to another embodiment of the invention the control unit is during such a condition programmed to register that the vehicle acceleration has ceased and if there is no other possible gear to upshift to, then the control unit will automatically decrease engine rotational speed down to a more efficient engine rotational speed, for example according to the example shown in FIG. 1 down to 1500 rpm.

In an alternative embodiment of the invention the control unit can be programmed to take a future vehicle condition into account when estimating if the engine will be able to reach the upshift rotational speed or not. According to known art this could be done by—providing the control unit with information from an electronic map and a GPS (Global Positioning System) or the like. The electronic map would need to have information about the topography of the landscape in order to foresee for example uphill slopes and its gradients. An alternative known solution would be to use a learning system that memorizes the topography first time passing a position and then use this information for above mentioned estimation second time traveling the same position.

In a further developed embodiment of the invention the control unit is programmed to return to normal engine control as soon as the vehicle travel resistance is estimated by the control unit to be below a first predetermined level, which first predetermined level is dependent of prevailing vehicle condition and coming upshift rotational speed. The same first predetermined level could be used in order to activate said automatic controlling of the engine torque. It is also possible to have a second predetermined level, which differs from said first, and which second predetermined level is used for activation of said automatic controlling of the engine torque. Said first and second predetermined levels can of coarse be dynamic, thus being adapted to current and future vehicle conditions.

In a further embodiment of the invention said automatic controlling of the engine torque can be inactivated when engine output torque needed for holding a predetermined engine rotational speed during prevailing vehicle travel resistance is below a predetermined engine output torque, for example under 65% of maximum engine output torque. The same or other predetermined engine out torque value can be used the opposite way, that is, in order to activate said automatic controlling of the engine torque.

The above mentioned embodiments of the invention could be programmed to be active only when a cruise control in the vehicle is activated. Thus, if the control unit during cruise control limits the engine speed to a more efficient rpm level then the control unit could be programmed to allow engine speed increase only if the driver manually demands it through for example an accelerator pedal.

In a further embodiment the control unit could be programmed to activate said engine rotational speed limiting function only when the vehicle is driven in a special mode, for example an economy mode.

In a further embodiment the control unit could be programmed to override said engine rotational speed limiting function when the driver is using, for example, a kick down function (known prior art) by depressing an accelerator pedal. This function to override said engine rotational speed limiting function could also be used in the embodiment above where no cruise control is used.

Figure 2:
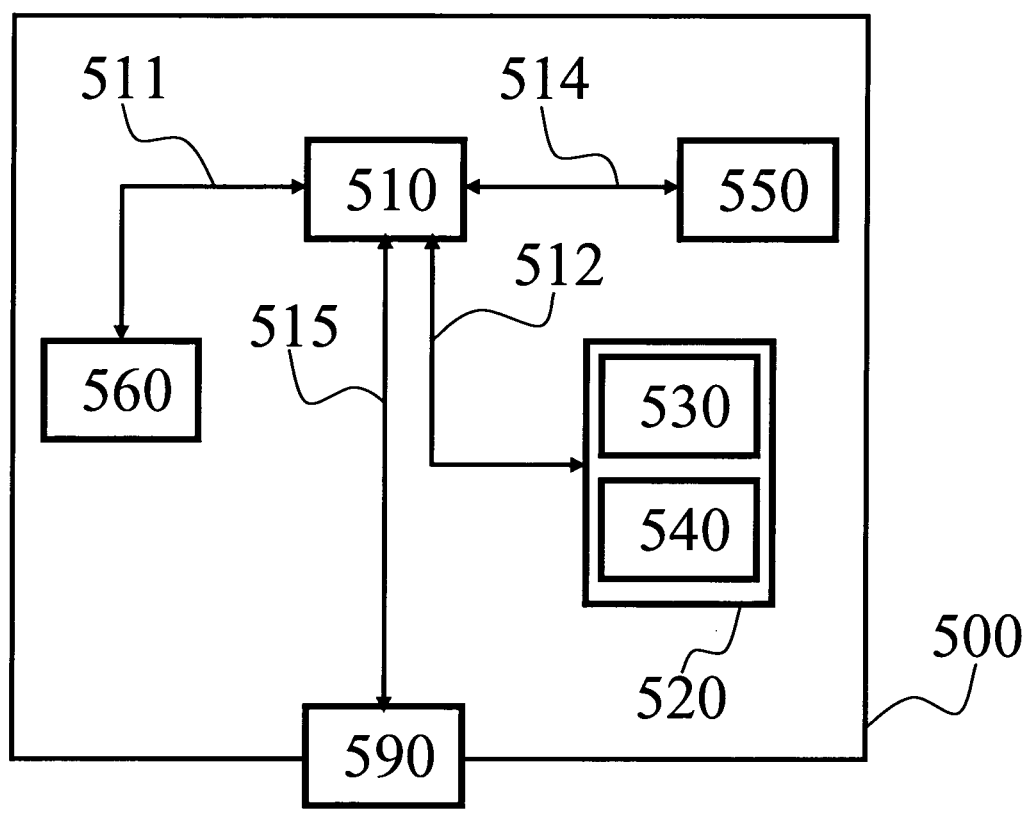
FIG. 2 shows the invention applied on a computer arrangement.

FIG. 2 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory, part 530 for controlling the apparatus 500 can be an operating system.

The apparatus 500 can be enclosed in, for example, said control unit. The data-processing unit 510 can comprise, for example, a microcomputer.

The memory 520 also has a second memory part 540, in which a program for said automatic controlling of the engine torque according to the invention is stored. In an alternative embodiment, the program for automatic controlling of the engine torque is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for a more efficient use of a combustion engine in a vehicle during driving of the vehicle, the vehicle comprising an automatic step geared transmission for automatic gear ratio adaptation of a gear ratio between an engine rotational speed and a rotational speed of driving wheels of the vehicle, comprising:
sensing current engine rotational speed and engine rotational speed increase,
estimating necessary minimum upshift engine rotational speed for a coming gear upshift;
registering that the engine rotational speed has stopped increasing without reaching the minimum upshift engine rotational speed, and where the engine rotational speed stops increasing at a first engine rotational speed within a predetermined distance of a maximum engine rotational speed where engine efficiency at the first engine rotational speed is below a first predetermined efficiency, and
automatically controlling engine output torque in order to limit the engine rotational speed to a first predetermined engine rotational speed where engine efficiency at the first predetermined engine rotational speed is above a second predetermined efficiency that is above the engine efficiency at the first engine rotational speed.

2. A method as in claim 1, wherein the step of registering that the engine rotational speed has stopped increasing without reaching the minimum upshift engine rotational speed is performed in advance before reaching the first engine rotational speed where engine efficiency is below the first predetermined engine efficiency.

3. A method as in claim 2, wherein the registering step performed in advance is done through an estimation based on present prevailing vehicle conditions.

4. A method as in claim 3, wherein the estimation is based on present prevailing vehicle conditions and vehicle conditions estimated likely to occur in near future of the vehicle.

5. A method as in claim 1, wherein the automatic controlling of the engine torque is performed after activating a cruise control arranged in the vehicle.

6. A method as in claim 1, wherein the automatic controlling of the engine torque is performed when a first vehicle driving mode is activated, which first driving mode differs from a second driving mode of the vehicle.

7. A method as in claim 1, comprising deactivating the automatic controlling of the engine torque is when a driver of the vehicle demands full power to the wheels.

8. A method as in claim 1, comprising deactivating the automatic controlling of the engine torque when a predetermined vehicle condition is registered.

9. A method as in claim 8, wherein the predetermined vehicle condition is a decrease of vehicle travel resistance to under a first predetermined level.

10. A method as in claim 9, wherein the automatic controlling of the engine torque is activated when the vehicle travel resistance has increased to above a second predetermined level.

11. A method as in claim 1, wherein the automatic controlling of the engine torque is independent of whether a driver of the vehicle demands maximum engine output torque.

12. A vehicle comprising a computer programmed with program code for executing a method for a more efficient use of a combustion engine in the vehicle during driving of the vehicle, the vehicle comprising an automatic step geared transmission for automatic gear ratio adaptation of a gear ratio between an engine rotational speed and a rotational speed of driving wheels of the vehicle, the method comprising:

sensing current engine rotational speed and engine rotational speed increase, estimating necessary minimum upshift engine rotational speed for a coming gear upshift;

registering that engine rotational speed has stopped increasing without reaching the minimum upshift engine rotational speed, and where the engine rotational speed stops increasing at a first engine rotational speed within a predetermined distance of a maximum engine rotational speed where engine efficiency at the first engine rotational speed is below a first predetermined efficiency, and automatically controlling engine output torque in order to limit the engine rotational speed to a first predetermined engine rotational speed where engine efficiency at the first predetermined engine rotational speed is above a second predetermined efficiency that is above the engine efficiency at the first engine rotational speed.

13. A vehicle comprising a computer comprising a non-transitory computer readable medium comprising program code for executing a method for a more efficient use of a combustion engine in the vehicle during driving of the vehicle, the vehicle comprising an automatic step geared transmission for automatic gear ratio adaptation of a gear ratio between an engine rotational speed and a rotational speed of driving: wheels of the vehicle, comprising:

sensing current engine rotational speed and engine rotational speed increase, estimating necessary minimum upshift engine rotational speed for a coming gear upshift;

registering that the engine rotational speed has stopped increasing without reaching the minimum upshift engine rotational speed, and where the engine rotational speed stops increasing at a first engine rotational speed within a predetermined distance of a maximum engine rotational speed where engine efficiency at the first engine rotational speed is below a first predetermined efficiency, and automatically controlling engine output torque in order to limit the engine rotational speed to a first predetermined engine rotational speed where engine efficiency at the first predetermined engine rotational speed is above a second predetermined efficiency that is above the engine efficiency at the first engine rotational speed.

14. A vehicle comprising a computer comprising a non-transitory computer program product directly loadable into an internal memory in the computer, which computer program product comprises a computer program for executing a method for a more efficient use of a combustion engine in the vehicle during driving of the vehicle, the vehicle comprising an automatic step geared transmission for automatic gear ratio adaptation of a gear ratio between an engine rotational speed and a rotational speed of driving wheels of the vehicle, comprising:

sensing current engine rotational speed and engine rotational speed increase, estimating necessary minimum upshift engine rotational speed for a coming gear upshift;

registering that the engine rotational speed has stopped increasing without reaching the minimum upshift engine rotational speed, and where the engine rotational speed stops increasing at a first engine rotational speed within a predetermined distance of a maximum engine rotational speed where engine efficiency at the first engine rotational speed is below a first predetermined efficiency, and automatically controlling engine output torque in order to limit the engine rotational speed to a first predetermined engine rotational speed where engine efficiency at the first predetermined engine rotational speed is above a second predetermined efficiency that is above the engine efficiency at the first engine rotational speed.

* * * * *